(12) United States Patent
Su et al.

(10) Patent No.: US 8,587,563 B2
(45) Date of Patent: Nov. 19, 2013

(54) TOUCH SYSTEM AND POSITIONING METHOD THEREFOR

(75) Inventors: Tzung Min Su, Hsin-Chu (TW); Chih Hsin Lin, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 349 days.

(21) Appl. No.: 13/115,468

(22) Filed: May 25, 2011

(65) Prior Publication Data

US 2011/0304590 A1    Dec. 15, 2011

(30) Foreign Application Priority Data

Jun. 14, 2010   (TW) ................................ 99119224 A

(51) Int. Cl.
*G06F 3/042*    (2006.01)

(52) U.S. Cl.
USPC ....................... 345/175; 178/18.09

(58) Field of Classification Search
USPC ........................................ 345/175; 178/18.09
See application file for complete search history.

(56) References Cited

U.S. PATENT DOCUMENTS

| | | | | |
|---|---|---|---|---|
| 5,933,138 A | * | 8/1999 | Driskell | ......................... 715/702 |
| 2010/0328243 A1 | * | 12/2010 | Wang et al. | ................... 345/173 |
| 2011/0080363 A1 | * | 4/2011 | Kao et al. | ...................... 345/173 |

* cited by examiner

*Primary Examiner* — Adam R Giesy
(74) *Attorney, Agent, or Firm* — Lowe, Hauptman & Ham

(57) ABSTRACT

The present invention provides a positioning method for a touch system that obtains a pair of current correct positions according to the following steps: obtaining two pairs of possible positions from a current frame to be compared with a pair of previous correct positions obtained from a previous frame; or comparing four pairs of possible positions with each other obtained from the current frame. The present invention further provides a touch system.

20 Claims, 13 Drawing Sheets

TOUCH SYSTEM AND POSITIONING METHOD THEREFOR

CROSS REFERENCE TO RELATED APPLICATION

This application claims the priority benefit of Taiwan Patent Application Serial Number 099119224, filed on Jun. 14, 2010, the full disclosure of which is incorporated herein by reference.

BACKGROUND

1. Field of the Invention

This invention generally relates to a touch system and, more particularly, to an optical touch system and a positioning method therefor.

2. Description of the Related Art

Please referring to FIGS. 1a and 1b, FIG. 1a shows a schematic diagram of an optical touch system and FIG. 1b shows a schematic diagram of image windows acquired by the two image sensors included in the touch system shown in FIG. 1a.

The touch system 9 includes a touch surface 90 and two image sensors 91 and 91'. The image sensors 91 and 91' are configured to acquire image windows $W_{91}$ and $W_{91}'$ respectively looking across the touch surface 90. When a finger 81 is hovering above or touches the touch surface 90, the image windows $W_{91}$ and $W_{91}'$ acquired by the image sensors 91 and 91' respectively include finger images $I_{81}$ and $I_{81}'$ of the finger 81. A processing unit 92 can calculate a two-dimensional coordinate of the finger 81 with respect to the touch surface 90 according to a one-dimensional position of the finger image $I_{81}$ in the image window $W_{91}$ and a one-dimensional position of the finger image $I_{81}'$ in the image window $W_{91}'$.

However, when a plurality of fingers are hovering above or touch the touch surface 90 simultaneously, one finger may block other finger or fingers with respect to a part of the image sensors. For example in FIG. 1a, when two fingers 81 and 82 are hovering above or touch the touch surface 90, the image sensor 91 acquires images of the fingers 81 and 82 following a route "a" and the image sensor 91' acquires images of the fingers 81 and 82 following routes "b" and "c" respectively. To the image sensor 91, as the finger 81 blocks the finger 82, the image window $W_{91}$ acquired by the image sensor 91 only includes a finger image $I_{81}+I_{82}$ (i.e. a combined image of the finger images $I_{81}$ and $I_{82}$). Therefore, the processing unit 92 is not able to correctly calculate two-dimensional coordinates of different fingers with respect to the touch surface 90 according to the finger images $I_{81}'$, $I_{82}'$ and $I_{81}+I_{82}$.

Accordingly, it is necessary to provide a positioning method for an optical touch system that can correctly position a plurality of pointers.

SUMMARY

The present invention provides a touch system and a positioning method therefor configured to correctly obtain two-dimensional coordinates of a plurality of pointers with respect to a touch system.

The present invention provides a positioning method for a touch system. The touch system includes a first image sensor and a second image sensor for acquiring image windows looking across a touch surface and containing images of two pointers operating above the touch surface. The positioning method includes the steps of: acquiring a first image window with the first image sensor; acquiring a second image window with the second image sensor; identifying numbers of pointer images in the first image window and the second image window; generating a two-dimensional space according to the first image window and the second image window when the first image window and the second image window contain different numbers of pointer images; connecting, on the two-dimensional space, a mapping position of the first image sensor with mapping positions of two outermost edges of the pointer image in the first image window and connecting, on the two-dimensional space, a mapping position of the second image sensor with mapping positions of two outermost edges of the pointer image in the second image window to form a quadrilateral; calculating four first internal bisectors of the quadrilateral; and connecting, on the two-dimensional space, a mapping position of the image sensor acquiring more pointer images with mapping positions of a predetermined point of the pointer images in the image window acquired by the same image sensor to intersect with the first internal bisectors thereby generating first possible positions.

In another aspect, a pair of previous correct positions of the pointers with respect to the touch surface was determined in a previous sample time (image capture time) before the first image sensor acquires the first image window and the second image sensor acquires the second image window. The positioning method further includes the steps of: comparing the first possible positions with the pair of previous correct positions to obtain a pair of current correct positions.

In another aspect, the touch system further includes a third image sensor for acquiring image windows looking across the touch surface and containing images of the two pointers. The positioning method further includes the steps of: acquiring a third image window with the third image sensor; identifying the numbers of pointer images in the first, second and third image windows; mapping the third image window to the two-dimensional space when the numbers of pointer images in two of the image windows are smaller than that in the rest image window; connecting, on the two-dimensional space, mapping positions of two image sensors acquiring fewer pointer image with mapping positions of two outermost edges of the pointer image in the image windows acquired by the same two image sensors to form a quadrilateral; calculating four second internal bisectors of the quadrilateral; connecting, on the two-dimensional space, a mapping position of the image sensor acquiring more pointer images with mapping positions of a predetermined point of the pointer images in the image window acquired by the same image sensor to intersect with the second internal bisectors thereby generating second possible positions; and comparing the first possible positions with the second possible positions to obtain a pair of current correct positions.

In another aspect, the touch system further includes a third image sensor for acquiring image windows looking across the touch surface and containing images of the two pointers. The positioning method further includes the steps of: acquiring a third image window with the third image sensor; identifying the numbers of pointer images in the first, second and third image windows; mapping the third image window to the two-dimensional space when the numbers of pointer images in two of the image windows are larger than that in the rest image window; connecting, on the two-dimensional space, a mapping position of one of two image sensors acquiring more pointer images with mapping positions of two outermost edges of the pointer images in the image window acquired by the same image sensor and connecting, on the two-dimensional space, a mapping position of the image sensor acquiring fewer pointer image with mapping positions of two outermost edges of the pointer image in the image window acquired by the same image sensor to form a quadrilateral; calculating four third internal bisectors of the quadrilateral; connecting, on the two-dimensional space, a mapping position of one of two image sensors acquiring more pointer images with mapping positions of a predetermined point of the pointer images in the image window acquired by the same image sensor to intersect with the third internal bisectors thereby generating third possible positions; and comparing the first possible positions with third possible positions to obtain a pair of current correct positions.

In another aspect, the touch system further includes a third image sensor for acquiring image windows looking across the touch surface and containing images of the two pointers. The positioning method further includes the steps of: acquiring a third image window with the third image sensor; identifying the numbers of pointer images in the first, second and third image windows; mapping the third image window to the two-dimensional space when the numbers of pointer images in two of the image windows are larger than that in the rest image window; connecting, on the two-dimensional space, mapping positions of two image sensors acquiring more pointer images with mapping positions of a predetermined point of the pointer images in the image windows acquired by the same two image sensors to form a quadrilateral; defining four corners of the quadrilateral as fourth possible positions of the pointers with respect to the touch surface; and comparing the first possible positions with the fourth possible positions to obtain a pair of current correct positions.

The present invention further provides a positioning method for a touch system. The touch system includes a first image sensor, a second image sensor and a third image sensor for acquiring image windows looking across a touch surface and containing images of two pointers operating above the touch surface. The positioning method includes the steps of: respectively acquiring an image window with three image sensors; identifying numbers of pointer images in the image windows; generating a two-dimensional space according to the three image windows; executing the following steps when the numbers of pointer images in two of the image windows is smaller then that in the rest image window: connecting, on the two-dimensional space, mapping positions of two image sensors acquiring fewer pointer image with mapping positions of two outermost edges of the pointer image in the image windows acquired by the same two image sensors to form a quadrilateral; calculating four second internal bisectors of the quadrilateral; and connecting, on the two-dimensional space, a mapping position of the image sensor acquiring more pointer images with mapping positions of a predetermined point of the pointer images in the image window acquired by the same image sensor to intersect with the second internal bisectors thereby generating second possible positions; and executing the following steps when the numbers of pointer images in two of the image windows is larger then that in the rest image window: connecting, on the two-dimensional space, a mapping position of one of two image sensors acquiring more pointer images with mapping positions of two outermost edges of the pointer images in the image window acquired by the same image sensor and connecting, on the two-dimensional space, a mapping position of the image sensor acquiring fewer pointer image with mapping positions of two outermost edges of the pointer image in the image window acquired by the same image sensor to form a quadrilateral; calculating four third internal bisectors of the quadrilateral; and connecting, on the two-dimensional space, a mapping position of one of two image sensors acquiring more pointer images with mapping positions of a predetermined point of the pointer images in the image window acquired by the same image sensor to intersect with the third internal bisectors thereby generating third possible positions.

In another aspect, a pair of previous correct positions of the pointers with respect to the touch surface was determined in a previous sample time (image capture time) before the image sensors acquire the image windows. The positioning method further includes the steps of: comparing the second possible positions with the pair of previous correct positions to obtain a pair of current correct positions when the numbers of pointer images in two of the image windows are smaller than that in the rest image window; and comparing the third possible positions with the pair of previous correct positions to obtain a pair of current correct positions when the numbers of pointer images in two of the image windows are larger than that in the rest image window.

In another aspect, the positioning method further includes the steps of: selecting two image sensors acquiring different numbers of pointer images; connecting, on the two-dimensional space, mapping positions of the two image sensors respectively with mapping positions of two outermost edges of the pointer images in the image windows acquired by the same two image sensors to form a quadrilateral; calculating four first internal bisectors of the quadrilateral; connecting, on the two-dimensional space, a mapping position of one of the two image sensors acquiring more pointer images with mapping positions of a predetermined point of the pointer images in the image window acquired by the same image sensor to intersect with the first internal bisectors thereby generating first possible positions, wherein comparing the second possible positions with the first possible positions to obtain a pair of current correct positions when the numbers of pointer images in two of the image windows are smaller than that in the rest image window, and comparing the third possible positions with the first possible positions to obtain a pair of current correct positions when the numbers of pointer images in two of the image windows are larger than that in the rest image window.

In another aspect, when the numbers of pointer images in two of the image windows are larger than that in the rest image window, the positioning method further includes the steps of: connecting, on the two-dimensional space, mapping positions of two image sensors acquiring more pointer images with mapping positions of a predetermined point of the pointer images in the image windows acquired by the same two image sensors to form a quadrilateral; defining four corners of the quadrilateral as fourth possible positions; and comparing the third possible positions with the fourth possible positions to obtain a pair of current correct positions.

The present invention further provides a touch system including a touch surface, at least two image sensors and a processing unit. A plurality of pointers are operated above the touch surface to accordingly control the touch system. The image sensors are configured to acquire image windows looking across the touch surface and containing images of the pointers operating above the touch surface. The processing unit generates a two-dimensional space according the image windows acquired by the image sensors, obtains a quadrilateral and four internal bisectors of the quadrilateral by connecting mapping positions of the image sensors with mapping positions of two outermost edges of the pointer image in the image windows acquired by the image sensors on the two-dimensional space, and connects a mapping position of the image sensor acquiring more pointer images with mapping positions of a predetermined point of the pointer images in the image window acquired by the same image sensor to intersect with the internal bisectors thereby generating possible positions.

In the touch system and positioning method therefore of the present invention, when the number of pointer images in the image window acquired by at least one image sensor is equal to an actual number of the pointers, correct positions of all pointers still can be calculated even though the number of pointer images in the image window acquired by the rest image sensor is smaller than the actual number of the pointers.

In the touch system and positioning method therefore of the present invention, two-dimensional information, such as two-dimensional coordinates, edge lines, position lines and internal bisectors, processed by the processing unit is mapped from the one-dimensional image windows acquired by a plurality of image sensors, wherein the internal bisectors may be calculated by using vector arithmetic from the four sides of the quadrilateral.

BRIEF DESCRIPTION OF THE DRAWINGS

Other objects, advantages, and novel features of the present invention will become more apparent from the following detailed description when taken in conjunction with the accompanying drawings.

FIG. 1b shows a schematic diagram of image windows acquired by the image sensors included in the touch system shown in FIG. 1a.

DETAILED DESCRIPTION OF THE EMBODIMENT

Figure 1A:
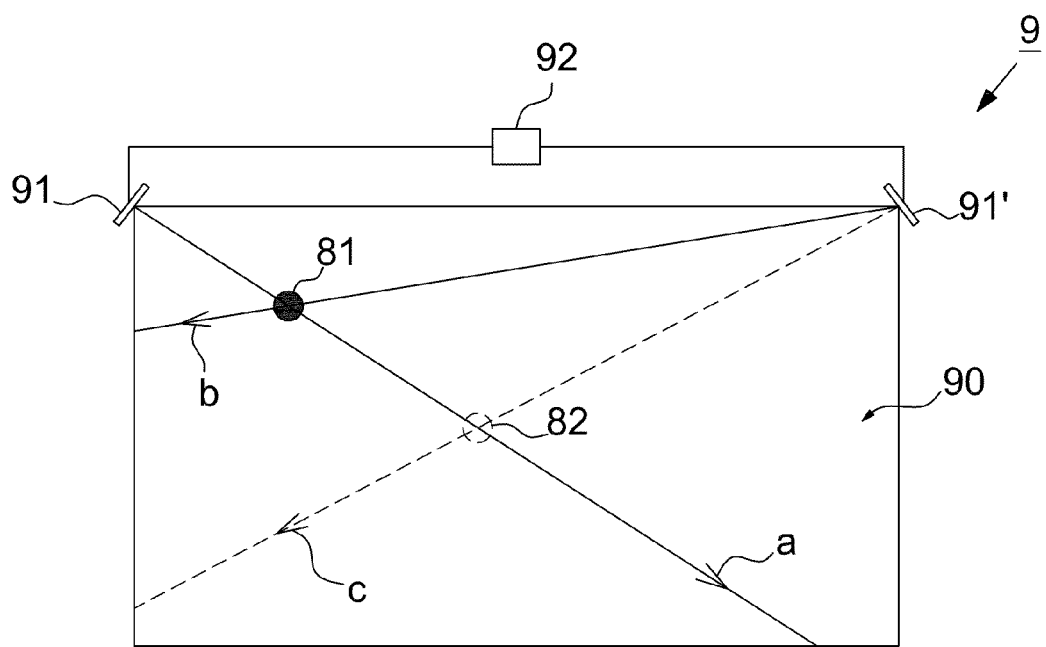
FIG. 1a shows a schematic diagram of an optical touch system.
Figure 1B:
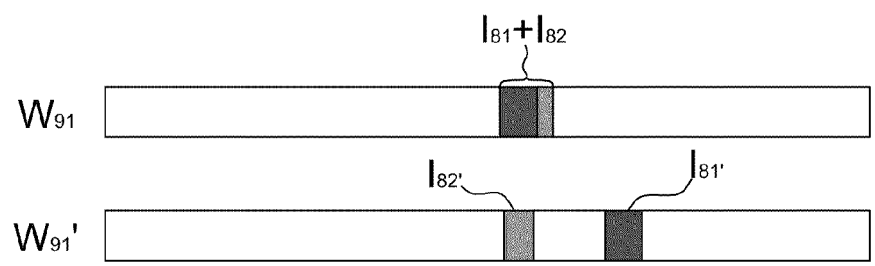

It should be noted that, wherever possible, the same reference numbers will be used throughout the drawings to refer to the same or like parts.

In addition, only a part of components are shown in the drawings and the components that are not directly pertinent to the present invention are omitted.

A touch system of the present invention includes at least two image sensors. A positioning method for the touch system is applicable to a touch system controlled by a user (not shown) with a plurality of pointers and in the touch system one pointer blocks another pointer with respect to at least one image sensor. That is, numbers of pointer images contained in the image windows acquired by the plurality of image sensors are different from actual numbers of the pointers. In addition, when the numbers of pointer images contained in the image windows acquired by the plurality of image sensors is equal to the actual numbers of the pointers, the two-dimensional coordinate of every pointer may be traced by using other conventional methods.

Figure 2A:
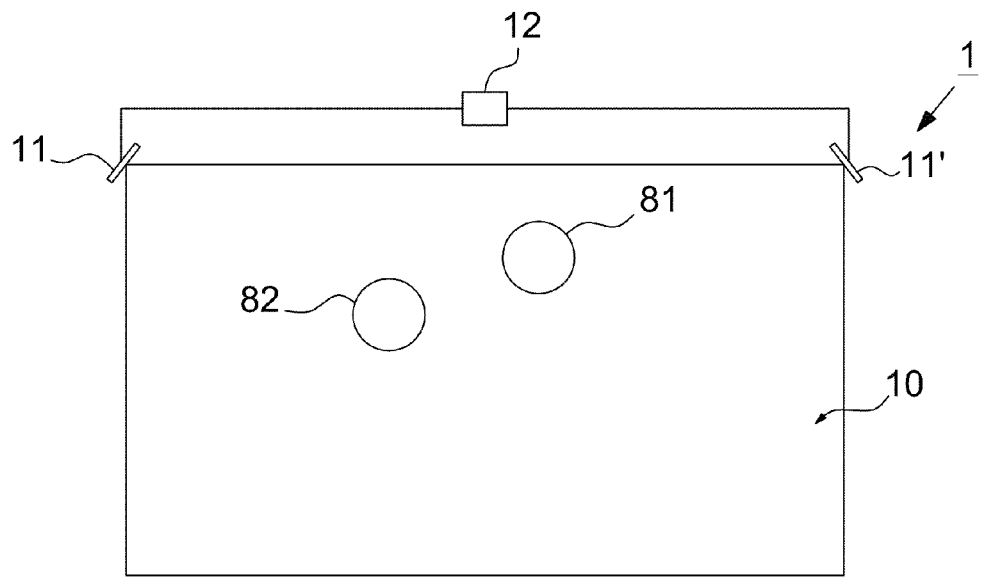
FIG. 2a shows a schematic diagram of the touch system according to the first embodiment of the present invention.

Please referring to FIG. 2a, it shows a schematic diagram of the touch system according to the first embodiment of the present invention. The touch system 1 includes a touch surface 10, a first image sensor 11, a second image sensor 11' and a processing unit 12. The touch surface 10 may be a white board, a touch screen or the surface of a suitable object. When the touch surface 10 is a touch screen, the touch surface 10 may also configured to display the operation status, such as the motion of a cursor or a predetermined function (e.g. screen rolling, object zooming or the like). In addition, the touch system 1 may further include a display for displaying the operation status.

The first image sensor 11 and the second image sensor 11' may be, for example CCD image sensors, CMOS image sensors or the like, and are configured to synchronously acquire an image window looking across the touch surface 10 within each image capture time. The image sensors may have the ability of blocking visible lights so as to eliminate the interference from ambient lights; for example, but not limited to, an optical bandpass filter may be disposed in front of the image sensors. The processing unit 12 is configured to process the image windows acquired by the first image sensor 11 and the second image sensor 11', and to trace and to position the pointers, such as to calculate the two-dimensional coordinates of the pointers 81 and 82 with respect to the touch surface 10. In this invention, the pointer may be a finger, a touch pen, a rod or other suitable objects. It is appreciated that, locations of the first image sensor 11 and the second image sensor 11' are not limited to those shown in FIG. 2a. For example, the first image sensor 11 may be disposed at the lower left corner and the second image sensor 11' may be disposed at the lower right corner.

Figure 2B:
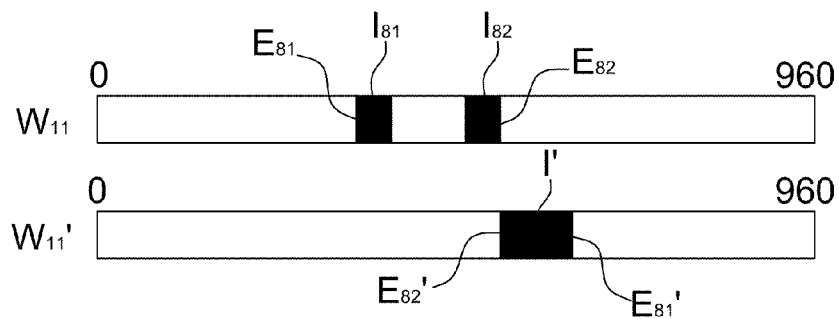
FIG. 2b shows a schematic diagram of image windows acquired by the image sensors included in the touch system according to the first embodiment of the present invention.

Please referring to FIG. 2b, it shows an image window $W_{11}$ acquired by the first image sensor 11 and an image window $W_{11}'$ acquired by the second image sensor 11' shown in FIG. 2a. The image window $W_{11}$ contains two pointer images $I_{81}$ and $I_{82}$ respectively corresponding to the pointers 81 and 82, and has a numerical range, such as 0 to 960, to form a one-dimensional space. The image window $W_{11}'$ contains a pointer image I' (combined image) corresponding to the pointers 81 and 82, and has a numerical range, such as 0 to 960, to form another one-dimensional space. It is appreciated that, the numerical range may be determined by an actual size of the touch surface 10.

Figure 2C:
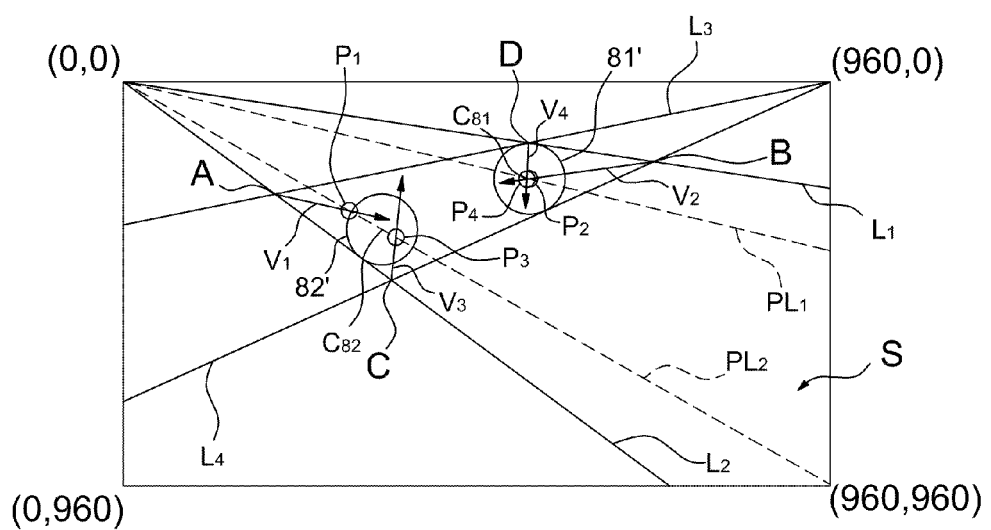
FIG. 2c shows a schematic diagram of the positioning method for the touch system according to the first embodiment of the present invention.

To the second image sensor 11', as the pointer 81 blocks the pointer 82, the image window $W_{11}'$ in FIG. 2b includes only one pointer image I'. According to the one-dimensional numerical ranges of the image windows $W_{11}$ and $W_{11}'$, a two-dimensional space S (as shown in FIG. 2c) can be mapped and the two-dimensional space S is corresponding to the touch surface 10. In other words, a pair of numerical numbers of the image windows $W_{11}$ and $W_{11}'$ corresponds to a two-dimensional coordinate on the two-dimensional space S. For example, $(W_{11}, W_{11}')=(0,0)$ corresponds to the upper left corner of the two-dimensional space S and $(W_{11}, W_{11}')=(960,960)$ corresponds to the lower right corner of the two-dimensional space S, but the present invention is not limited thereto. A corresponding relationship between a pair of numerical numbers of the image windows and a two-dimensional coordinate may be determined according to the actual application.

The positioning method of every embodiment or aspect of the present invention may be implemented by performing two-dimensional coordinate operation and vector arithmetic on the two-dimensional space S.

Please referring to FIGS. 2a to 2d, FIG. 2d shows a flow chart of the positioning method for a touch system according to the first embodiment of the present invention including the steps of: acquiring a first image window with a first image sensor (Step $S_{10}$); acquiring a second image window with a second image sensor (Step $S_{11}$); identifying numbers of pointer images in the first image window and the second image window (Step $S_{12}$); generating a two-dimensional space according to the first image window and the second image window when the first image window and the second image window contain different numbers of pointer images (Step $S_{13}$); connecting, on the two-dimensional space, a mapping position of the first image sensor with mapping positions of two outermost edges of the pointer image in the first image window to form a first edge line and a second edge line, and connecting, on the two-dimensional space, a mapping position of the second image sensor with mapping positions of two outermost edges of the pointer image in the second image window to form a third edge line and a fourth edge line (Step $S_{14}$); calculating four internal bisectors of a quadrilateral formed by the first edge line to the fourth edge line (Step $S_{15}$); connecting, on the two-dimensional space, a mapping position of the image sensor acquiring more pointer images with mapping positions of a predetermined point of the pointer images in the image window acquired by the same image sensor to form two first position lines (Step $S_{16}$); defining cross points of the first position lines and the first internal bisectors as first possible positions (Step $S_{17}$); and comparing the first possible positions with a pair of previous correct positions to obtain a pair of current correct positions (Step $S_{18}$), wherein the pair of previous correct positions is determined in a previous image capture time (sample time) of the first image sensor and the second image sensor. In addition, before comparing the first possible positions and a pair of previous correct positions, two possible positions associated with the two internal bisectors of two opposite corners of the quadrilateral may be defined as a pair of first possible positions, and each pair of the first possible positions is then compared with the pair of previous correct positions pair by pair.

The image sensors 11 and 11' respectively acquire an image window $W_{11}$ and $W_{11}'$ at a sample time "t", and one of the image windows $W_{11}$ and $W_{11}'$ includes only one pointer image (Steps $S_{10}$, $S_{11}$). In the meantime, it is assumed that both image windows $W_{11}$ and $W_{11}'$ respectively acquired by the image sensors 11 and 11' at a sample time "t−1" include two pointer images. That is, one of the pointers 81 and 82 does not block the other with respect to any image sensor at the sample time "t−1".

Please referring to FIGS. 2a to 2c, the processing unit 12 processes the image windows $W_{11}$ and $W_{11}'$ so as to identify whether the image windows $W_{11}$ and $W_{11}'$ contain an identical number of pointer images (Step $S_{12}$). When the processing unit 12 identifies that the first image window $W_{11}$ and the second image window $W_{11}'$ contain different numbers of pointer images, the processing unit 12 generates a two-dimensional space S (FIG. 2c) according to the first image window $W_{11}$ and the second image window $W_{11}'$. For example, the first image window $W_{11}$ contains two pointer images $I_{81}$ and $I_{82}$ while the second image window $W_{11}'$ contains only one pointer image I' (Step $S_{13}$). Next, the processing unit 12 obtains positions of the pointers 81 and 82 with respect to the touch surface 10 using the positioning method of the present invention. The processing unit 12 now respectively maps the pointers 81 and 82 to the pointer images 81' and 82' on the two-dimensional space S. In addition, the first image sensor 11 and the second image sensor 11' are respectively mapped to mapping positions (0,0) and (960,0) on the two-dimensional space S. It is appreciated that, mapping positions of the image sensors on the two-dimensional space S are determined according to locations of the image sensors disposed on the touch surface 10.

Next, the processing unit 12 connects a mapping position (0,0) of the first image sensor 11 on the two-dimensional space S with mapping positions of two outermost edges $E_{81}$ and $E_{82}$ of the pointer images $I_{81}$ and $I_{82}$ in the first image window $W_{11}$ on the two-dimensional space S so as to form a first edge line $L_1$ and a second edge line $L_2$; and connects a mapping position (960,0) of the second image sensor 11' on the two-dimensional space S with mapping positions of two outermost edges $E_{81}'$ and $E_{82}'$ of the pointer image I' in the second image window $W_{11}'$ on the two-dimensional space S so as to form a third edge line $L_3$ and a fourth edge line $L_4$ (Step $S_{14}$). The processing unit 12 then calculates four first internal bisectors $V_1$ to $V_4$ of a quadrilateral ADBC formed by the first edge line $L_1$ to the fourth edge line $L_4$, wherein the first internal bisector $V_1$ may be obtained by using the vectors $\overrightarrow{AD}$ and $\overrightarrow{AC}$. Similarly, internal bisectors $V_2$ to $V_4$ may be obtained in the same way (Step $S_{15}$).

Next, the processing unit 12 connects a mapping position (0,0) of the image sensor acquiring more pointer images (i.e. the first image sensor 11 herein) on the two-dimensional space S with mapping positions (i.e. centers $C_{81}$ and $C_{82}$ of the pointer images) of a predetermined point (e.g. center pointer or center of weight) of the pointer images in the first image window $W_{11}$ on the two-dimensional space S to form two first poison lines $PL_1$ and $PL_2$ (Step $S_{16}$). Then, the processing unit 12 defines four cross points of the first position lines $PL_1$, $PL_2$ and the first internal bisectors $V_1$ to $V_4$ as four first possible positions $P_1$ to $P_4$; wherein two first possible positions associated with the two internal bisectors of two opposite corners of the quadrilateral ADBC may be defined as a pair of first possible positions. For example, $P_1$ and $P_2$ may be defined as a pair of first possible positions and $P_3$ and $P_4$ may be defined as another pair of first possible positions (Step $S_{17}$). Finally, the processing unit 12 compares the first possible positions $P_1$ to $P_4$ with a pair of previous correct positions determined in a previous sample time "t−1" of the first image sensor 11 and the second image sensor 11' so as to determine a pair of current correct positions (Step $S_{18}$). For example in an embodiment, the characteristic such as a distance, a moving direction, a moving speed or the like of the pair of previous correct positions and two pairs of first possible positions $P_1$, $P_2$ and $P_3$, $P_4$ may be respectively compared. When the pair of previous correct positions has a shortest distance, a closest moving direction or a closest moving speed with one pair of the first possible positions, the pair of first possible positions is identified as the current correct positions, such as $P_3$ and $P_4$ herein. In another embodiment, the four first possible positions $P_1$ to $P_4$ may be respectively compared with the pair of previous correct positions to obtain two current correct positions.

Figure 2D:
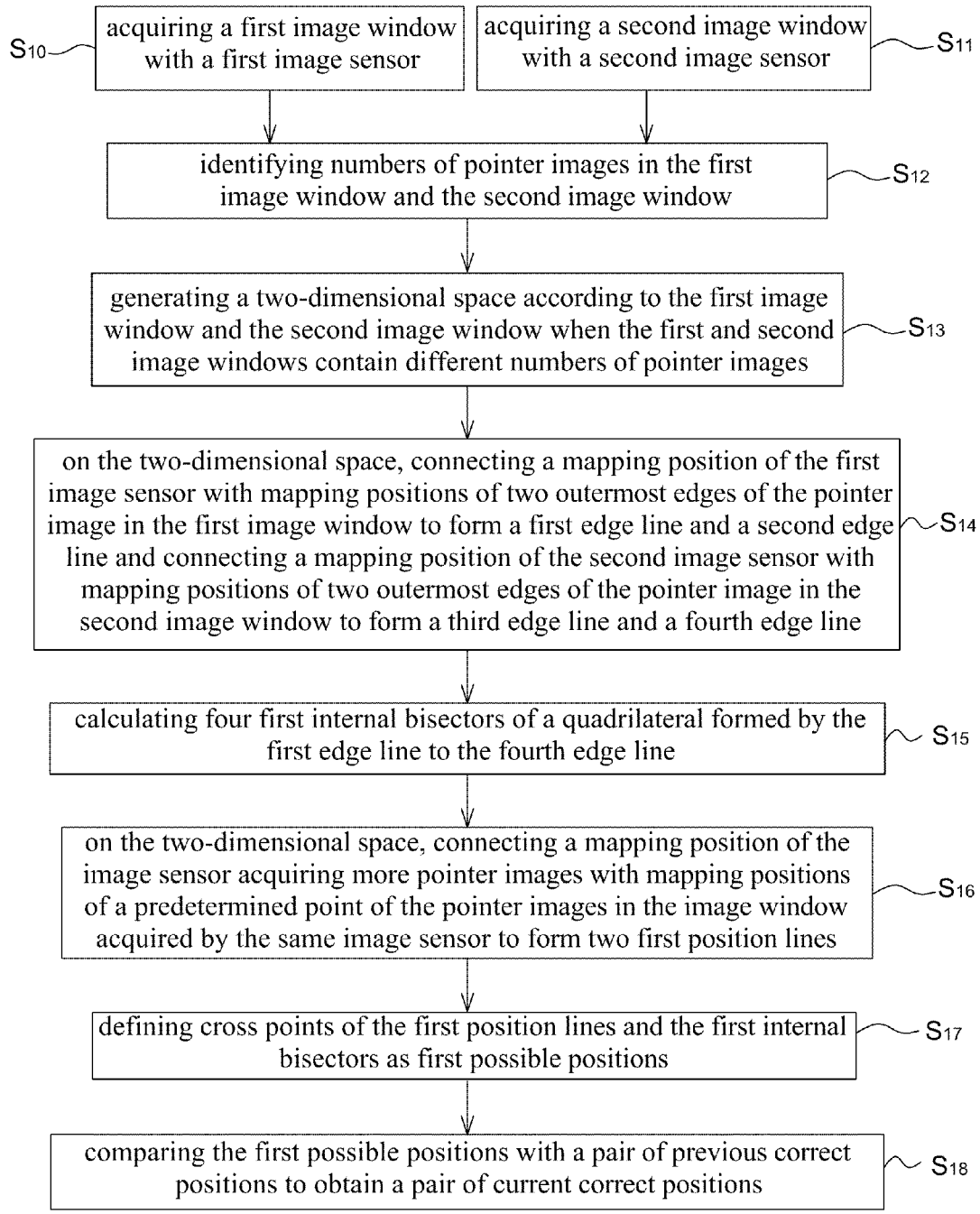
FIG. 2d shows a flow chart of the positioning method for the touch system according to the first embodiment of the present invention.

It is appreciated that, some steps shown in FIG. 2d may be combined together and the steps shown therein are only for illustrating the implementation of the positioning method of the present invention rather than limitations to the present invention. For example, the process of obtaining the quadrilateral in Step $S_{15}$ may be performed in Step $S_{14}$.

Figure 3:
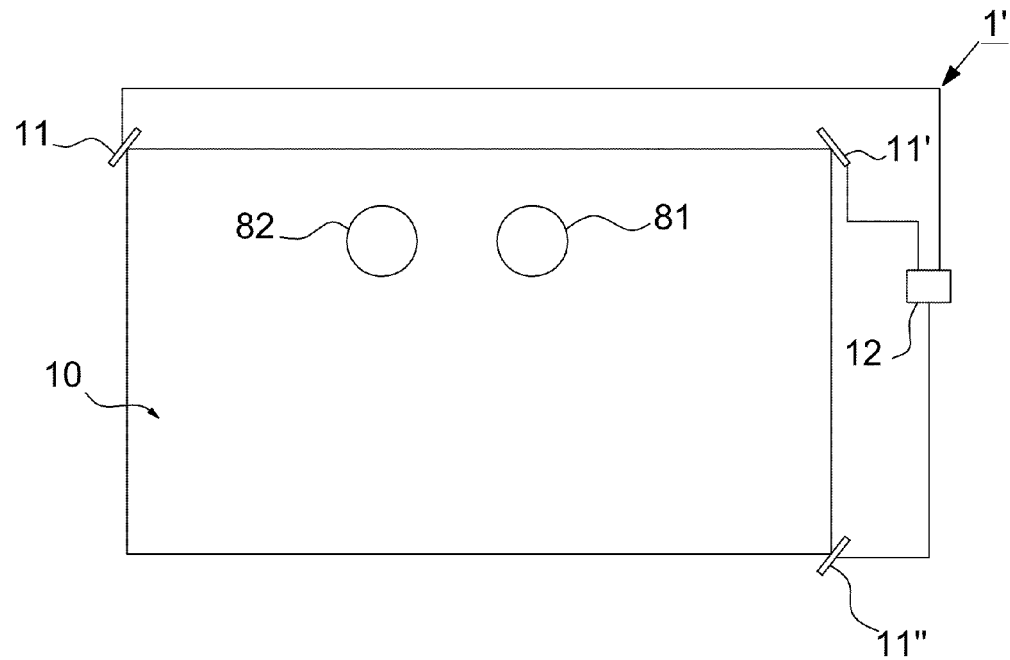
FIG. 3 shows a schematic diagram of the touch system according to the second embodiment of the present invention.

Please referring to FIG. 3, it shows a schematic diagram of the touch system 1' according to the second embodiment of the present invention including a touch surface 10, a first image sensor 11, a second image sensor 11', a third image sensor 11" and a processing unit 12. The difference between this embodiment and the first embodiment is that the touch system 1' includes three image sensors in this embodiment. Similarly, the processing unit 12 processes the image windows acquired by the image sensors to accordingly generate a two-dimensional space. The positioning method of the present invention is implemented by performing coordinate operation and vector arithmetic on the two-dimensional space. It is appreciated that, locations of the first image sensor 11, the second image sensor 11' and the third image sensor 11" are not limited to those shown in FIG. 3. For example, the third image senor 11" may also be disposed at lower left corner.

Figure 4A:
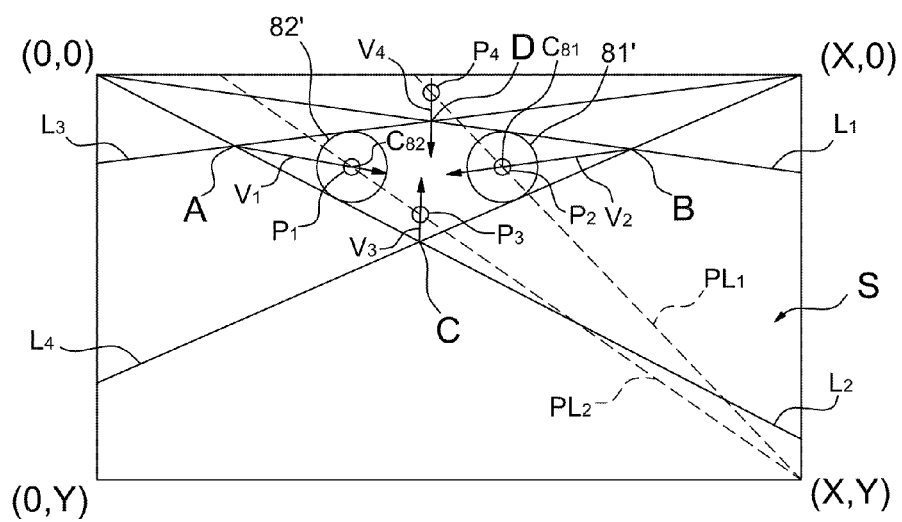
FIG. 4a shows a schematic diagram of the positioning method for the touch system according to a first aspect of the second embodiment of the present invention.

Please referring to FIG. 4a, it shows a schematic diagram of the positioning method for a touch system according to a first aspect of the second embodiment of the present invention, in which the processing unit 12 generates a two-dimensional space S according to the image windows acquired by all image sensors and four corners of the two-dimensional space S are assumed as (0,0), (X,0), (0,Y) and (X,Y). This aspect is applied to the case that numbers of pointer images in the image windows acquired by two image sensors of the touch system 1' are smaller than that acquired by the rest image sensor. For example, the image windows acquired by the first image sensor 11 and the second image sensor 11' include only one pointer image and the image window acquired by the third image sensor 11" includes two pointer images. This aspect is configured to obtain two pairs of possible positions or a pair of current correct positions.

Figure 4B:
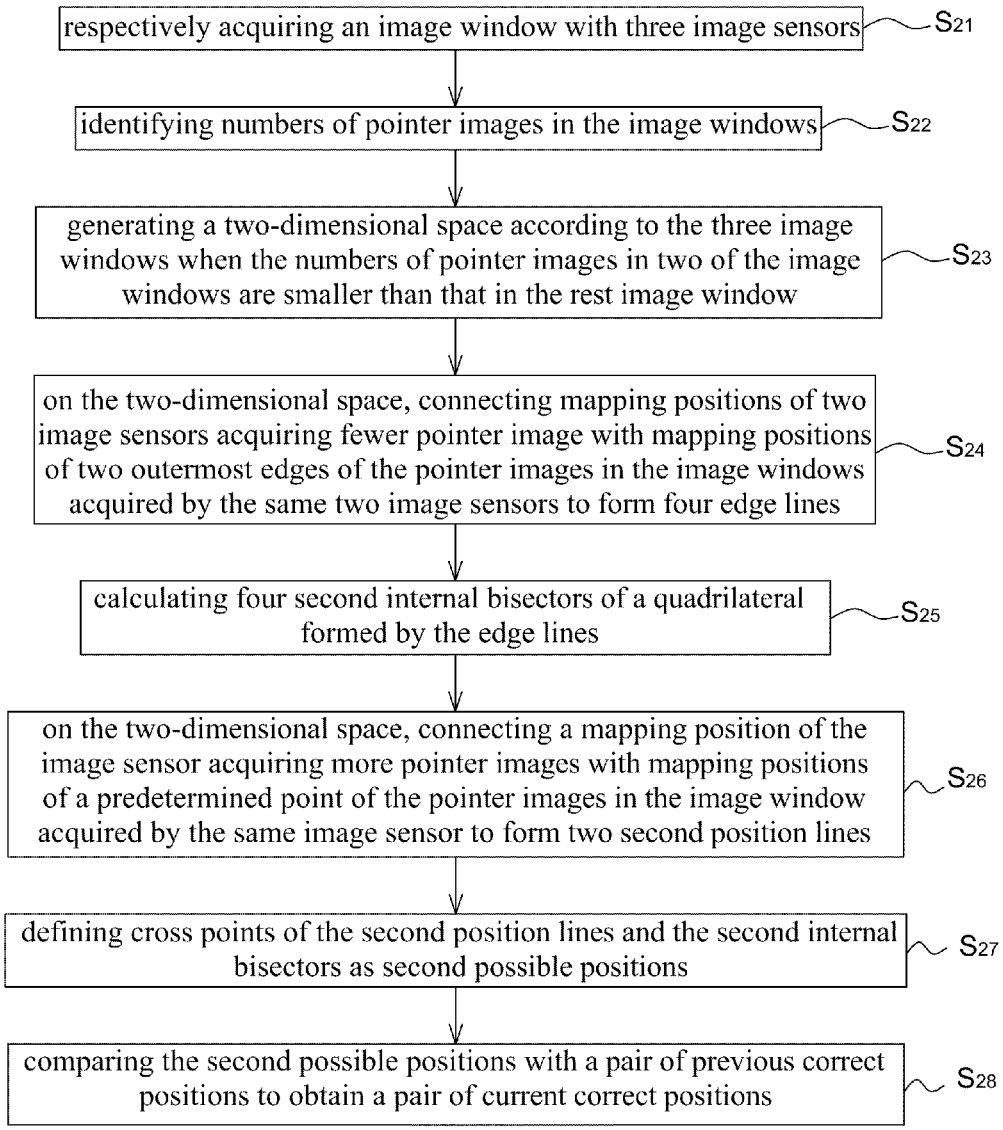
FIG. 4b shows a flow chart of the positioning method for the touch system according to the first aspect of the second embodiment of the present invention.

FIG. 4b shows a flow chart of the positioning method according to the present aspect including the steps of: respectively acquiring an image window with three image sensors (Step $S_{21}$); identifying numbers of pointer images in the image windows (Step $S_{22}$); generating a two-dimensional space according to the three image windows when the numbers of pointer images in two of the image windows are smaller than that in the rest image window (Step $S_{23}$); connecting mapping positions of two image sensors acquiring fewer pointer image with mapping positions of two outermost edges of the pointer images in the image windows acquired by the same two image sensors on the two-dimensional space to form four edge lines (Step $S_{24}$); calculating four second internal bisectors of a quadrilateral formed by the edge lines (Step $S_{25}$); connecting a mapping position of the image sensor acquiring more pointer images with mapping positions of a predetermined point of the pointer images in the image window acquired by the same image sensor on the two-dimensional space to form two second position lines (Step $S_{26}$); defining cross points of the second position lines and the second internal bisectors as second possible positions (Step $S_{27}$); and comparing the second possible positions with a pair of previous correct positions to obtain a pair of current correct positions (Step $S_{28}$), wherein the pair of previous correct positions is determined in a previous sample time of the first image sensor to the third image sensor.

Please referring to FIGS. 4a and 4b, the image sensors 11, 11' and 11" respectively acquire an image window at a sample time "t", and two of the acquired image windows contain only one pointer image (Step $S_{21}$). In the meanwhile, it is assumed that the image windows respectively acquired by the image sensors 11, 11' and 11" at a sample time "t−1" all include two pointer images. That is, one of the pointers 81 and 82 does not block the other with respect to any image sensor at the sample time "t−1".

The processing unit 12 identifies numbers of pointer images in the image windows (Step $S_{22}$). When the processing unit 12 identifies that the numbers of pointer images in two of the image windows are smaller than that in the rest image window, the processing unit 12 generates a two-dimensional space S according to the three image windows. For example, the image windows acquired by the first image sensor 11 and the second image sensor 11' contain only one pointer image while the image window acquired by the third image sensor 11" contains two pointer images (Step $S_{23}$). The processing unit 12 now maps the pointers 81 and 82 to the pointer images 81' and 82' on the two-dimensional space S. In addition, the first image sensor 11, the second image sensor 11' and the third image sensor 11" are respectively mapped to mapping positions (0,0), (X,0) and (X,Y) on the two-dimensional space S. Similarly, mappings positions of the image sensors on the two-dimensional space S are determined according to locations of the image sensors disposed on the touch surface 10.

Next, the processing unit 12 connects mapping positions (0,0) and (X,0) of two image sensors acquiring fewer pointer image (i.e. the first image sensor 11 and second image sensor 11' herein) respectively with mapping positions of two outermost edges of the pointer image in the image windows acquired by the same two image sensors on the two-dimensional space S to form four edge lines $L_1$ to $L_4$ (Step $S_{24}$). The processing unit 12 calculates four second internal bisectors $V_1$ to $V_4$ of a quadrilateral ADBC formed by the first edge line $L_1$ to the fourth edge line $L_4$ (Step $S_{25}$). The processing unit 12 connects a mapping position (X,Y) of the image sensor acquiring more pointer images (i.e. the third image sensor 11") with mapping positions $C_{81}$ and $C_{82}$ of a predetermined point (e.g. center point or center of weight) of the pointer images in the image window acquired by the same image sensor on the two-dimensional space S to form two second position lines $PL_1$ and $PL_2$ (Step $S_{26}$). The processing unit 12 defines four cross points of the second position lines $PL_1$, $PL_2$ and the second internal bisectors $V_1$ to $V_4$ as four second possible positions $P_1$ to $P_4$ (Step $S_{27}$).

In this aspect, the processing unit 12 may obtain a pair of current correct positions by comparing the second possible positions $P_1$ to $P_4$ obtained in this aspect with other possible positions, which will be obtained in other aspects hereinafter; or by comparing the second possible positions $P_1$ to $P_4$ with a pair of previous correct positions (as illustrated in the first embodiment) determined in a previous sample time "t−1" of the first image sensor 11 to the third image sensor 11" (Step $S_{28}$). For example, two of the second possible positions $P_1$ to $P_4$ having shortest distances, closest moving directions or moving speeds with respect to the pair of previous correct positions are identified as the pair of current correct positions, such as $P_1$ and $P_2$ herein.

Figure 4C:
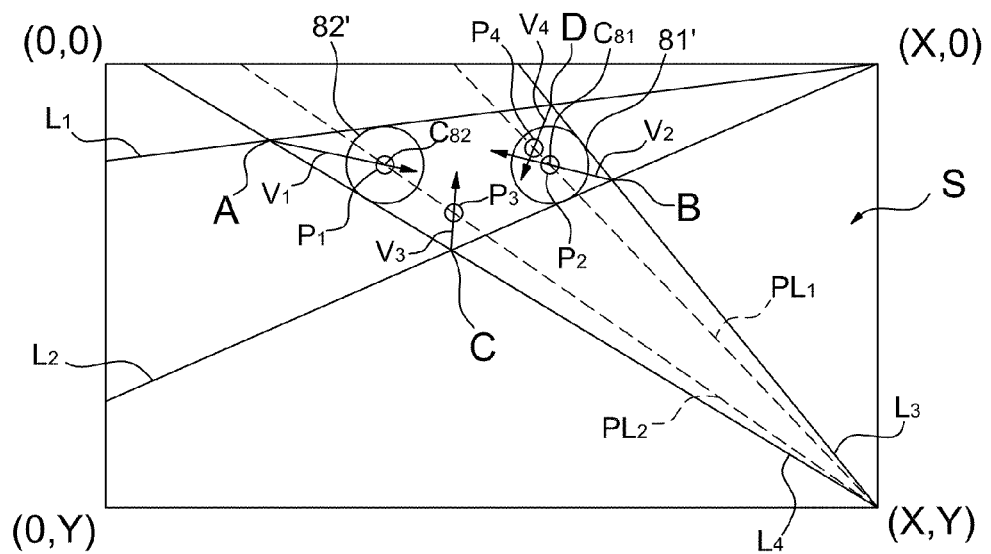
FIG. 4c shows a schematic diagram of the positioning method for the touch system according to a second aspect of the second embodiment of the present invention.

Please referring to FIG. 4c, it shows a schematic diagram of the positioning method for a touch system 1' according to a second aspect of the second embodiment of the present invention. This aspect is also applied to the case that numbers of pointer images in the image windows acquired by two image sensors of the touch system 1' are smaller than that acquired by the rest image sensor. This aspect is configured to obtain two pairs of possible positions or a pair of current correct positions.

Figure 4D:
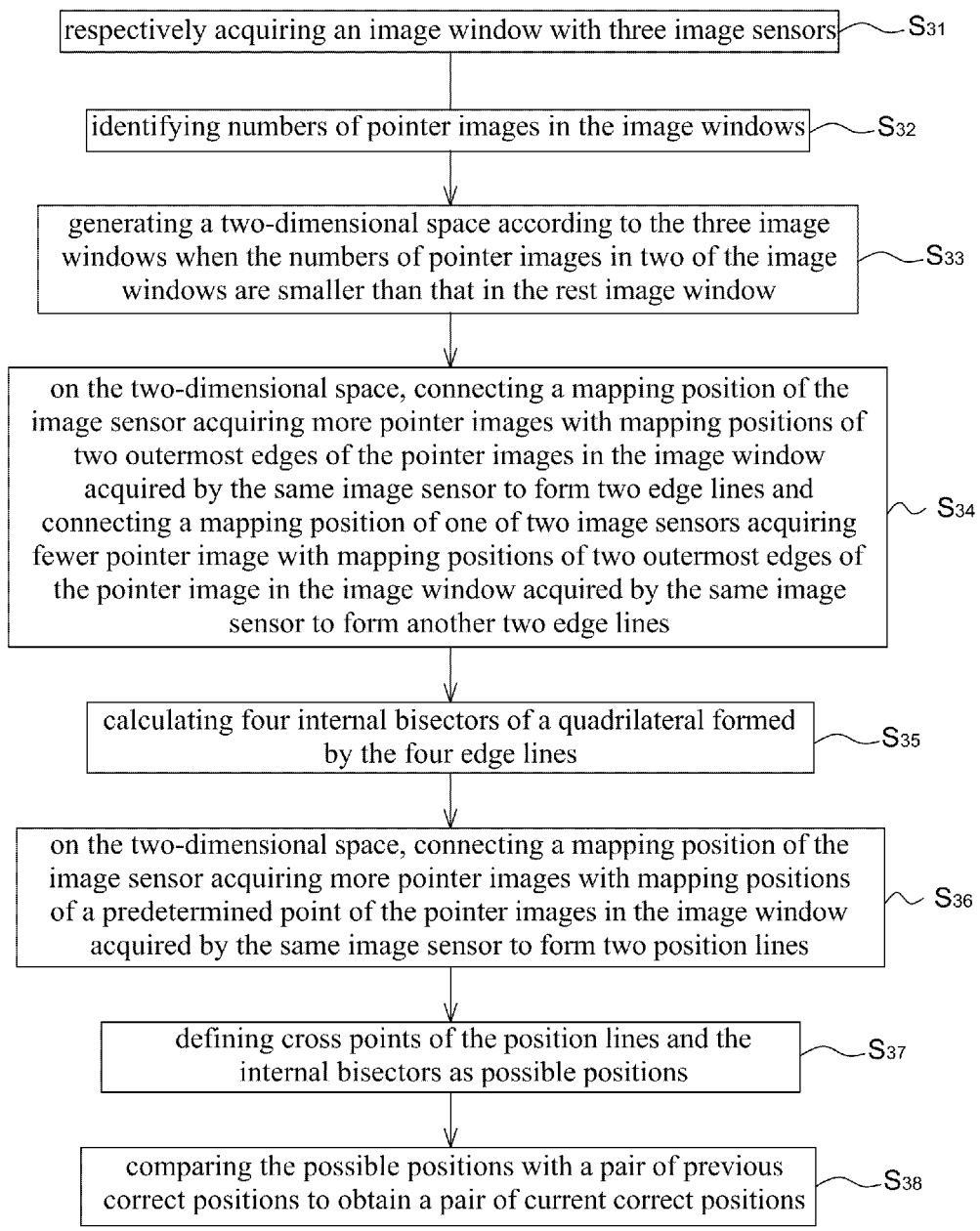
FIG. 4d shows a flow chart of the positioning method for the touch system according to the second aspect of the second embodiment of the present invention.

FIG. 4d shows a flow chart of the positioning method according to the present aspect including the steps of: respectively acquiring an image window with three image sensors (Step $S_{31}$); identifying numbers of pointer images in the image windows (Step $S_{32}$); generating a two-dimensional space according to the three image windows when the numbers of pointer images in two of the image windows are smaller than that in the rest image window (Step $S_{33}$); connecting a mapping position of the image sensor acquiring more pointer images with mapping positions of two outermost edges of the pointer images in the image window acquired by the same image sensor on the two-dimensional space to form two edge lines, and connecting a mapping position of one of two image sensors acquiring fewer pointer image with mapping positions of two outermost edges of the pointer image in the image window acquired by the same image sensor on the two-dimensional space to form another two edge lines (Step $S_{34}$); calculating four internal bisectors of a quadrilateral formed by the four edge lines (Step $S_{35}$); connecting a mapping position of the image sensor acquiring more pointer images with mapping positions of a predetermined point of the pointer images in the image window acquired by the same image sensor on the two-dimensional space to form two position lines (Step $S_{36}$); defining cross points of the position lines and the internal bisectors as possible positions (Step $S_{37}$); and comparing the possible positions with a pair of previous correct positions to obtain a pair of current correct positions (Step $S_{38}$), wherein the pair of previous correct positions is determined in a previous sample time of the first image sensor to the third image sensor.

Please referring to FIGS. 4c and 4d together, the image sensors 11, 11' and 11" respectively acquire an image window at a sample time "t", and two of the acquired image windows contain only one pointer image (Step $S_{31}$). In the meanwhile, it is assumed that image windows respectively acquired by the image sensors 11, 11' and 11" at a sample time "t−1" all include two pointer images.

The processing unit 12 identifies numbers of pointer images in the image windows (Step $S_{32}$). When the numbers of pointer images in two of the image windows are identified to be smaller than that in the rest image window, the processing unit 12 generates a two-dimensional space S according to the three image windows (Step $S_{33}$), wherein the pointers 81 and 82 are respectively mapped to the pointer images 81' and 82' on the two-dimensional space S.

Next, the processing unit 12 obtains possible positions (Steps $S_{34}$ to $S_{37}$) or a pair of current correct positions (Step $S_{38}$) according to the image sensor acquiring more pointer images (i.e. the third image sensor 11" herein) and one of the two image sensors acquiring fewer pointer image (i.e. the first image sensor 11 or the second image sensor 11' herein) by using the method illustrated in the first embodiment, and details thereof were already illustrated in the first embodiment and thus will not be repeated herein.

In this aspect, the processing unit 12 may compare the possible positions obtained according to a current frame with the first possible positions of the first embodiment or the second possible positions of the first aspect of the second embodiment to obtain a pair of current correct positions, such as comparing shortest distances between those possible positions. Or the processing unit 12 may compare the possible positions obtained in this aspect with a pair of previous correct positions determined in a previous sample time "t−1" of the first image sensor 11 to third image sensor 11" to obtain a pair of current correct positions.

Please referring to FIGS. 5a to 5d, they show schematic diagrams of the positioning method for a touch system 1' according to a third aspect of the second embodiment of the present invention, in which the processing unit 12 generates a two-dimensional space S according to the image windows acquired by all image sensors and four corners of the two-dimensional space S are assumed as (0,0), (X,0), (0,Y) and (X,Y). This aspect is applied to the case that numbers of pointer images in the image windows acquired by two image sensors of the touch system 1' are larger than that acquired by the rest image sensor. For example, the image windows acquired by the first image sensor 11 and the third image sensor 11" contain two pointer images while the image window acquired by the second image sensor 11' contains only one pointer image. This aspect is configured to obtain two pairs of possible positions or a pair of current correct positions.

Figure 5A:
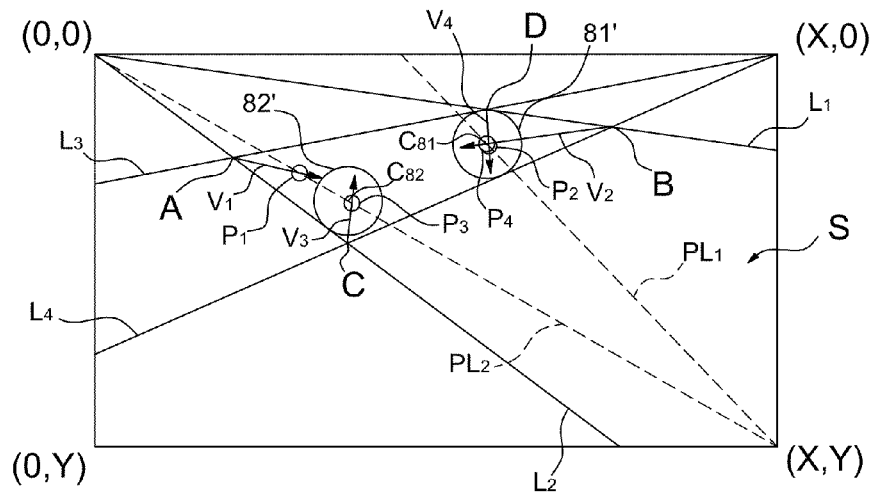
FIGS. 5a to 5d show schematic diagrams of the positioning method for the touch system according to a third aspect of the second embodiment of the present invention.
Figure 5B:
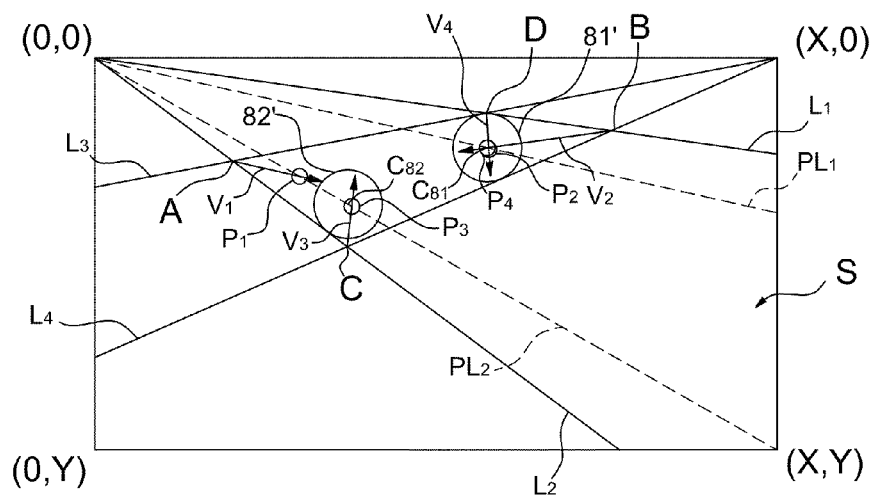
Figure 5C:
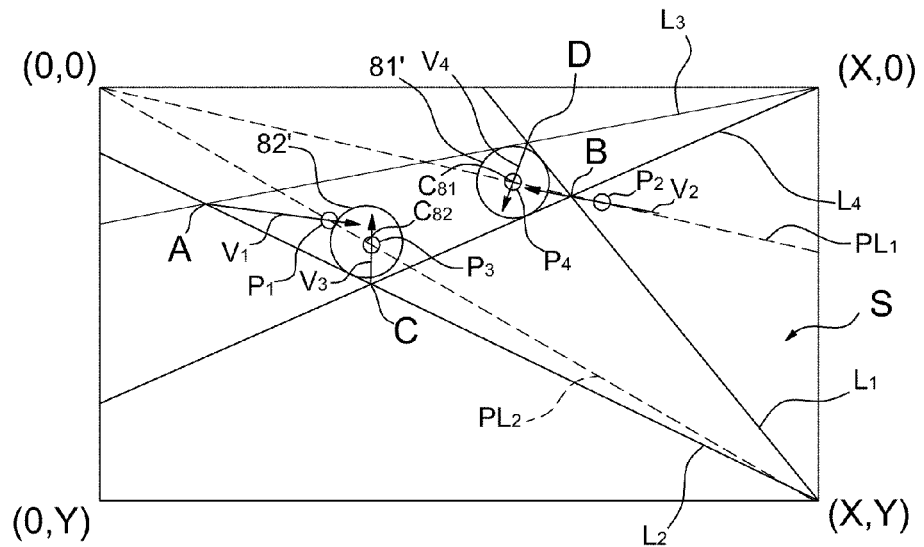
Figure 5D:
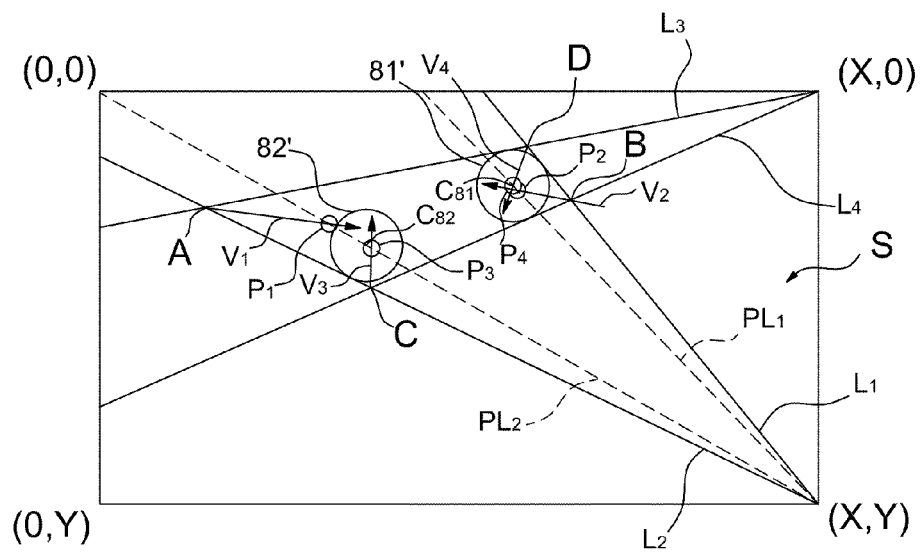
Figure 5E:
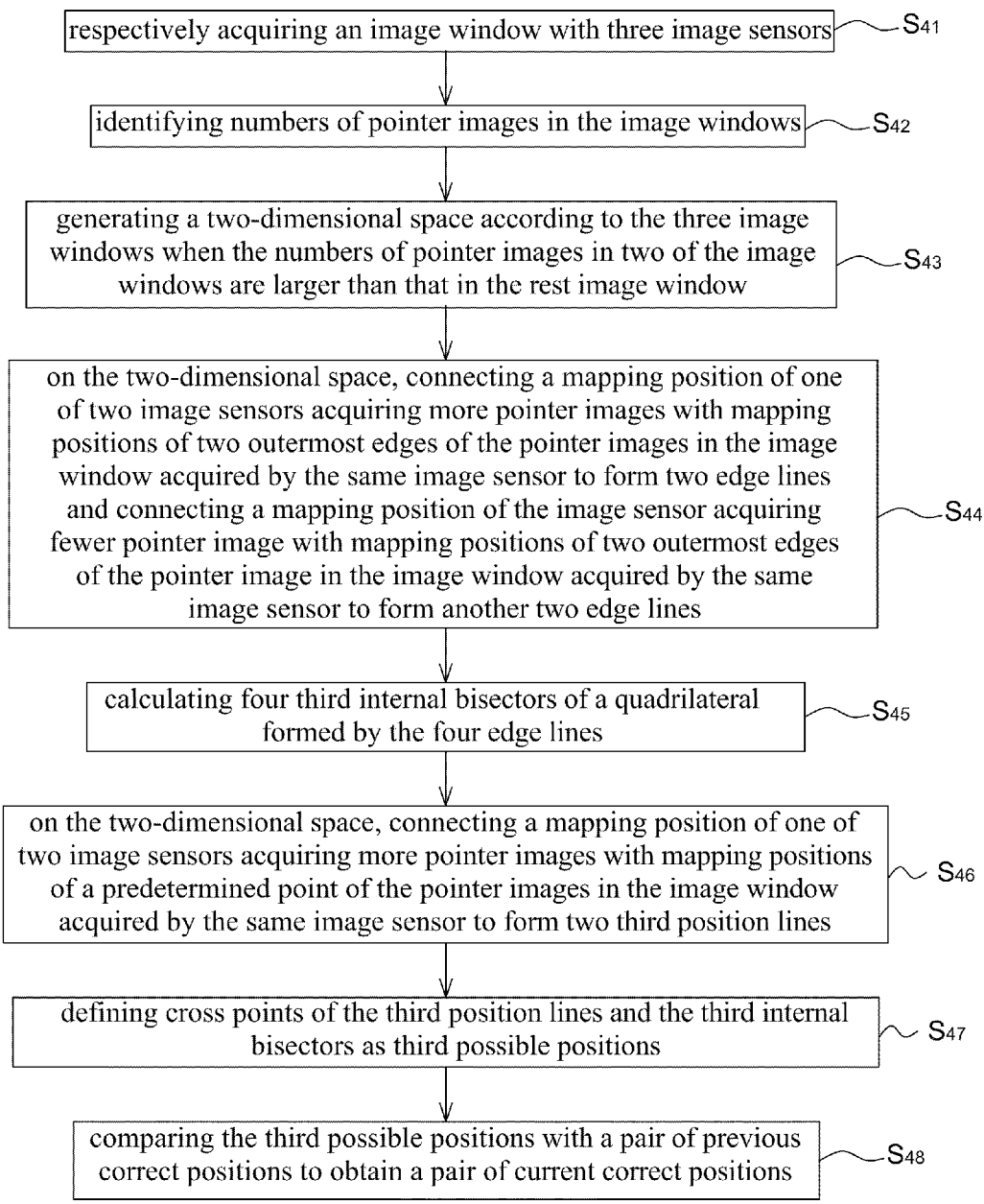
FIG. 5e shows a flow chart of the positioning method for the touch system according to the third aspect of the second embodiment of the present invention.

FIG. 5e shows a flow chart of the positioning method according to the present aspect including the steps of: respectively acquiring an image window with three image sensors (Step $S_{41}$); identifying numbers of pointer images in the image windows (Step $S_{42}$); generating a two-dimensional space according to the three image windows when the numbers of pointer images in two of the image windows are larger than that in the rest image window (Step $S_{43}$); connecting a mapping position of one of two image sensors acquiring more pointer images with mapping positions of two outermost edges of the pointer images in the image window acquired by the same image sensor on the two-dimensional space to form two edge lines, and connecting a mapping position of the image sensor acquiring fewer pointer image with mapping positions of two outermost edges of the pointer image in the image window acquired by the same image sensor on the two-dimensional space to form another two edge lines (Step $S_{44}$); calculating four third internal bisectors of a quadrilateral formed by the four edge lines (Step $S_{45}$); connecting a mapping position of one of two image sensors acquiring more pointer images with mapping positions of a predetermined point of the pointer images in the image window acquired by the same image sensor on the two-dimensional space to form two third position lines (Step $S_{46}$); defining cross points of the third position lines and the third internal bisectors as third possible positions (Step $S_{47}$); and comparing the third possible positions with a pair of previous correct positions to obtain a pair of current correct positions (Step $S_{48}$), wherein the pair of previous correct positions is determined in a previous sample time of the first image sensor to the third image sensor.

Please referring to FIGS. 5a and 5e together, the image sensors 11, 11' and 11" respectively acquire an image window at a sample time "t", and one of the acquired image windows contains only one pointer image (Step $S_{41}$). In the meanwhile, it is assumed that image windows respectively acquired by the image sensors 11, 11' and 11" at a sample time "t−1" all include two pointer images.

The processing unit 12 identifies numbers of pointer images in the image windows (Step $S_{42}$). When the processing unit 12 identifies that the numbers of pointer images in two of the image windows are larger than that in the rest image window, the processing unit 12 generates a two-dimensional space S according to the three image windows (Step $S_{43}$). The processing unit 12 respectively maps the pointers 81 and 82 to the pointer images 81' and 82' on the two-dimensional space S. In addition, the first image sensor 11, the second image sensor 11' and the third image sensor 11" are respectively mapped to mapping positions (0,0), (X,0) and (X,Y) on the two-dimensional space S.

Next, the processing unit 12 connects a mapping position (0,0) or (X,Y) of one of two image sensors acquiring more pointer images (i.e. the first image sensor 11 in FIGS. 5a and 5b; the third image sensor 11" in FIGS. 5c and 5d) with mapping positions of two outermost edges of the pointer images in the image window acquired by the same image sensor on the two-dimensional space S to form two edge lines $L_1$ and $L_2$, and connects a mapping position (X,0) of the image sensor acquiring fewer pointer image (i.e. the second image sensor 11') with mapping positions of two outermost edges of the pointer image in the image window acquired by the same image sensor on the two-dimensional space S to form another two edge lines $L_3$ and $L_4$ (Step $S_{44}$). Then, the processing unit 12 calculates four third internal bisectors $V_1$ to $V_4$ of a quadrilateral ADBC formed by the four edge lines $L_1$ to $L_4$ (Step $S_{45}$). The processing unit 12 connects a mapping position (0,0) or (X,Y) of one of two image sensors acquiring more pointer images (i.e. the third image sensor 11" in FIGS. 5a and 5d; the first image sensor 11 in FIGS. 5b and 5c) with mapping positions $C_{81}$ an $C_{82}$ of a predetermined point (e.g. center point or center of weight) of the pointer images in the image window acquired by the same image sensor on the two-dimensional space S to form two third position lines $PL_1$ and $PL_2$ (Step $S_{46}$). Four cross points $P_1$ to $P_4$ of the third position lines $PL_1$, $PL_2$ and the third internal bisectors $V_1$ to $V_4$ are defined as third possible positions (Step $S_{47}$).

In this aspect, the processing unit 12 may compare the third possible positions $P_1$ to $P_4$ with the first possible positions of the first embodiment, the second possible positions of the first aspect of the second embodiment or the possible positions of the second aspect of the second embodiment to obtain a pair of current correct positions. Or the processing unit 12 may compare the third possible positions with a pair of previous correct positions (as illustrated in the first embodiment) determined in a previous sample time "t−1" of the first image sensor 11 to the third image sensor 11" so as to obtain a pair of current correct positions (Step $S_{48}$). It is appreciated that, this aspect may also obtain two pairs of possible positions according to two image sensors acquiring different numbers of pointer images (e.g. the first image sensor 11 and the second image sensor 11', or the second image sensor 11' and the third image sensor 11"), and details thereof were already illustrated in the first embodiment and thus will not be repeated herein.

Figure 6A:
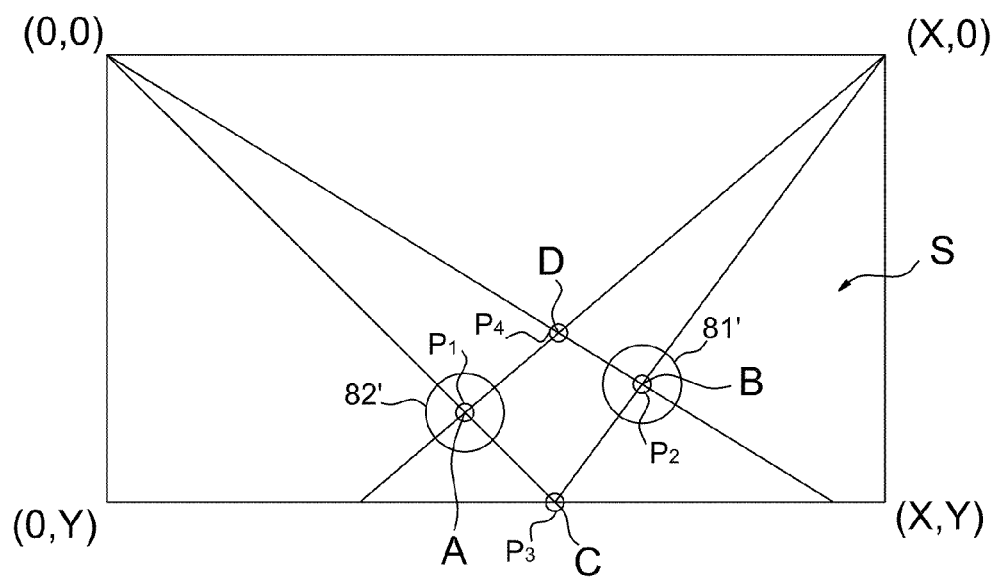
FIG. 6a shows a schematic diagram of the positioning method for the touch system according to a fourth aspect of the second embodiment of the present invention.

Please referring to FIG. 6a, it shows a schematic diagram of the positioning method for a touch system 1' according to a fourth aspect of the second embodiment of the present invention, in which the processing unit 12 generates a two-dimensional space S according to the image windows acquired by all image sensors and four corners of the two-dimensional space S are assumed as (0,0), (X,0), (0,Y) and (X,Y). This aspect is applied to the case that numbers of pointer images in the image windows acquired by two image sensors of the touch system 1' are larger than that acquired by the rest image sensor. For example, the image windows acquired by the first image sensor 11 and the second image sensor 11' contain two pointer images while the image window acquired by the third image sensor 11" contains only one pointer image. This aspect is configured to obtain two pairs of possible positions or a pair of current correct positions.

Figure 6B:
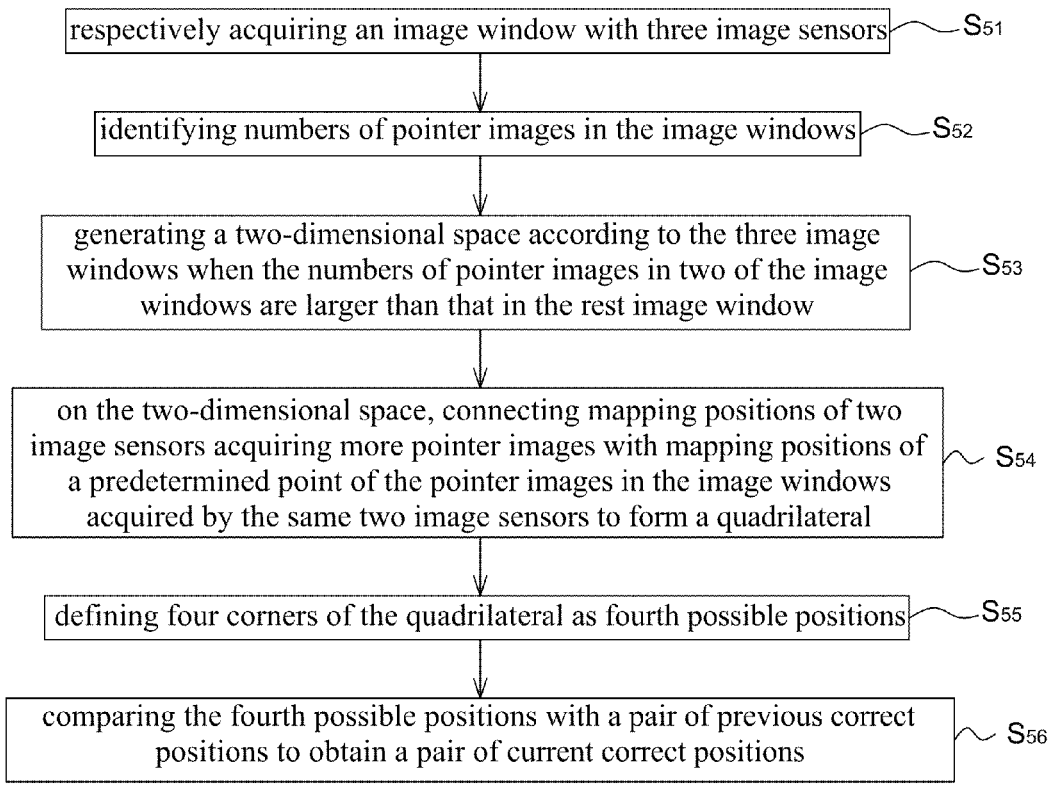
FIG. 6b shows a flow chart of the positioning method for the touch system according to the fourth aspect of the second embodiment of the present invention.

FIG. 6b shows a flow chart of the positioning method according to the present aspect including the steps of: respectively acquiring an image window with three image sensors (Step $S_{51}$); identifying numbers of pointer images in the image windows (Step $S_{52}$); generating a two-dimensional space according to the three image windows when the numbers of pointer images in two of the image windows are larger than that in the rest image window (Step $S_{53}$); connecting mapping positions of two image sensors acquiring more pointer images with mapping positions of a predetermined point of the pointer images in the image windows acquired by the same two image sensors on the two-dimensional space to form a quadrilateral (Step $S_{54}$); defining four corners of the quadrilateral as fourth possible positions (Step $S_{55}$); and comparing the fourth possible positions with a pair of previous correct positions to obtain a pair of current correct positions (Step $S_{56}$), wherein the pair of previous correct positions is determined in a previous sample time of the first image sensor to the third image sensor.

Please referring to FIGS. 6a and 6b together, the image sensors 11, 11' and 11" respectively acquire an image window at a sample time "t", and one of the acquired image windows contains only one pointer image (Step $S_{51}$). In the meanwhile, it is assumed that image windows respectively acquired by the image sensors 11, 11' and 11" at a sample time "t−1" all include two pointer images.

The processing unit 12 identifies numbers of pointer images in the image windows (Step $S_{52}$). When the numbers of pointer images in two of the image windows are identified to be larger than that in the rest image window, the processing unit 12 generates a two-dimensional space S according to the three image windows (Step $S_{53}$), wherein the pointers 81 and 82 are respectively mapped to the pointer images 81' and 82' on the two-dimensional space S; and the first image sensor 11, the second image sensor 11' and the third image sensor 11" are respectively mapped to mapping positions (0,0), (X,0) and (X,Y) on the two-dimensional space S.

Next, the processing unit 12 connects mapping positions (0,0) and (X,0) of two image sensors acquiring more pointer images (i.e. the first image sensor 11 and the second image sensor 11') respectively with mapping positions of a predetermined point (e.g. center point or center of weight) of the pointer images in the image windows acquired by the same two image sensors on the two-dimensional space S to form a quadrilateral ADBC (Step $S_{54}$). Four corners of the quadrilateral ADBC are defined as fourth possible positions (Step $S_{55}$).

In this aspect, the processing unit 12 may compare the fourth possible positions $P_1$ to $P_4$ obtained in this aspect with the possible positions obtained in the first embodiment or in every aspect of the second embodiment to obtain a pair of current correct positions. Or the processing unit 12 may compare the fourth possible positions obtained in this aspect with a pair of previous correct positions (as illustrated in the first embodiment) determined in a previous sample time "t−1" of the first image sensor 11 to the third image sensor 11" so as to obtain a pair of current correct positions (Step $S_{56}$). It is appreciated that, this aspect may also obtain two pairs of possible positions according to two image sensors acquiring different numbers of pointer images (e.g. the second image sensor 11' and the third image sensor 11"), and details thereof were already illustrated in the first embodiment and thus will not be repeated herein.

In a word, the positioning method for a touch system of the present invention may obtain a pair of current correct positions by comparing two pairs of possible positions in a current frame with a pair of previous correct positions in a previous frame; or obtain a pair of current correct positions by comparing two pairs of possible positions in a current frame respectively obtained from different embodiments or aspects described above. In the present invention, the previous frame is an effective frame previous to the current frame. For example, if an immediately previous frame of the current frame has a poor image quality so that it is identified as an invalid frame, the previous frame of the current frame may be the second or the nth frame previous to the current frame.

In addition, although two pointers are used for illustration in the above embodiments and aspects, the positioning method of the present invention is also applicable to the positioning of more than two pointers.

In addition, in the comparison of possible positions, the present invention is not limited to compare a pair of possible positions at the same time, and every possible position may be sequentially and separately compared so as to obtain current correct positions. For example, four possible positions ($P_1$, $P_2$, $P_3$, $P_4$) obtained in any embodiment or aspect above may be respectively compared with another four possible positions ($P_1'$, $P_2'$, $P_3'$, $P_4'$) obtained in another embodiment or aspect. Or positions, moving speeds and/or moving directions of four possible positions ($P_1$, $P_2$, $P_3$, $P_4$) obtained in any embodiment or aspect above may be compared with that of a pair of previous correct positions so as to obtain two or a pair of current correct positions.

As mentioned above, as conventional touch systems have the problem of unable to correctly position a plurality of pointers, the present invention further provides a touch system (FIGS. 2a and 3) and a positioning method therefore (FIGS. 2d, 4b, 4d, 5e and 6b) that can correctly trace and position two-dimensional coordinates of a plurality of pointers with respect to a touch system.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A positioning method for a touch system, the touch system comprising a first image sensor and a second image sensor for acquiring image windows looking across a touch surface and containing images of two pointers operating above the touch surface, the positioning method comprising the steps of:
   acquiring a first image window with the first image sensor;
   acquiring a second image window with the second image sensor;
   identifying numbers of pointer images in the first image window and the second image window;
   generating a two-dimensional space according to the first image window and the second image window when the first image window and the second image window contain different numbers of pointer images;
   connecting, on the two-dimensional space, a mapping position of the first image sensor with mapping positions of two outermost edges of the pointer image in the first image window and connecting, on the two-dimensional space, a mapping position of the second image sensor with mapping positions of two outermost edges of the pointer image in the second image window to form a quadrilateral;
   calculating four first internal bisectors of the quadrilateral; and
   connecting, on the two-dimensional space, a mapping position of the image sensor acquiring more pointer images with mapping positions of a predetermined point of the pointer images in the image window acquired by the same image sensor to intersect with the first internal bisectors thereby generating first possible positions.

2. The positioning method as claimed in claim 1, further comprising:
   defining two first possible positions associated with the two first internal bisectors of two opposite corners of the quadrilateral as a pair of first possible positions.

3. The positioning method as claimed in claim 1, wherein a pair of previous correct positions of the pointers with respect to the touch surface was determined in a previous sample time before the first image sensor acquires the first image window and the second image sensor acquires the second image window, and the positioning method further comprises:
   comparing the first possible positions with the pair of previous correct positions to obtain a pair of current correct positions.

4. The positioning method as claimed in claim 3, wherein the comparison process is to compare a distance, a moving direction and/or a moving speed of the first possible positions with that of the pair of previous correct positions.

5. The positioning method as claimed in claim 1, wherein the touch system further comprises a third image sensor for acquiring image windows looking across the touch surface and containing images of the two pointers, and the positioning method further comprises:
   acquiring a third image window with the third image sensor;
   identifying the numbers of pointer images in the first, second and third image windows;
   mapping the third image window to the two-dimensional space when the numbers of pointer images in two of the image windows are smaller than that in the rest image window;
   connecting, on the two-dimensional space, mapping positions of two image sensors acquiring fewer pointer image with mapping positions of two outermost edges of the pointer image in the image windows acquired by the same two image sensors to form a quadrilateral;
   calculating four second internal bisectors of the quadrilateral;
   connecting, on the two-dimensional space, a mapping position of the image sensor acquiring more pointer images with mapping positions of a predetermined point of the pointer images in the image window acquired by the same image sensor to intersect with the second internal bisectors thereby generating second possible positions; and
   comparing the first possible positions with the second possible positions to obtain a pair of current correct positions.

6. The positioning method as claimed in claim 5, wherein the predetermined point is a center point or a center of weight of the pointer image.

7. The positioning method as claimed in claim 1, wherein the touch system further comprises a third image sensor for acquiring image windows looking across the touch surface and containing images of the two pointers, and the positioning method further comprises:
  acquiring a third image window with the third image sensor;
  identifying the numbers of pointer images in the first, second and third image windows;
  mapping the third image window to the two-dimensional space when the numbers of pointer images in two of the image windows are larger than that in the rest image window;
  connecting, on the two-dimensional space, a mapping position of one of two image sensors acquiring more pointer images with mapping positions of two outermost edges of the pointer images in the image window acquired by the same image sensor and connecting, on the two-dimensional space, a mapping position of the image sensor acquiring fewer pointer image with mapping positions of two outermost edges of the pointer image in the image window acquired by the same image sensor to form a quadrilateral;
  calculating four third internal bisectors of the quadrilateral;
  connecting, on the two-dimensional space, a mapping position of one of two image sensors acquiring more pointer images with mapping positions of a predetermined point of the pointer images in the image window acquired by the same image sensor to intersect with the third internal bisectors thereby generating third possible positions; and
  comparing the first possible positions with the third possible positions to obtain a pair of current correct positions.

8. The positioning method as claimed in claim 7, wherein the predetermined point is a center point or a center of weight of the pointer image.

9. The positioning method as claimed in claim 1, wherein the touch system further comprises a third image sensor for acquiring image windows looking across the touch surface and containing images of the two pointers, and the positioning method further comprises:
  acquiring a third image window with the third image sensor;
  identifying the numbers of pointer images in the first, second and third image windows;
  mapping the third image window to the two-dimensional space when the numbers of pointer images in two of the image windows are larger than that in the rest image window;
  connecting, on the two-dimensional space, mapping positions of two image sensors acquiring more pointer images with mapping positions of a predetermined point of the pointer images in the image windows acquired by the same two image sensors to form a quadrilateral;
  defining four corners of the quadrilateral as fourth possible positions; and
  comparing the first possible positions with the fourth possible positions to obtain a pair of current correct positions.

10. The positioning method as claimed in claim 9, wherein the predetermined point is a center point or a center of weight of the pointer image.

11. The positioning method as claimed in claim 1, wherein the predetermined point is a center point or a center of weight of the pointer image.

12. A positioning method for a touch system, the touch system comprising a first image sensor, a second image sensor and a third image sensor for acquiring image windows looking across a touch surface and containing images of two pointers operating above the touch surface, the positioning method comprising the steps of:
  respectively acquiring an image window with three image sensors;
  identifying numbers of pointer images in the image windows;
  generating a two-dimensional space according to the three image windows;
  executing the following steps when the numbers of pointer images in two of the image windows is smaller then that in the rest image window:
    connecting, on the two-dimensional space, mapping positions of two image sensors acquiring fewer pointer image with mapping positions of two outermost edges of the pointer image in the image windows acquired by the same two image sensors to form a quadrilateral;
    calculating four second internal bisectors of the quadrilateral; and
    connecting, on the two-dimensional space, a mapping position of the image sensor acquiring more pointer images with mapping positions of a predetermined point of the pointer images in the image window acquired by the same image sensor to intersect with the second internal bisectors thereby generating second possible positions; and
  executing the following steps when the numbers of pointer images in two of the image windows is larger then that in the rest image window:
    connecting, on the two-dimensional space, a mapping position of one of two image sensors acquiring more pointer images with mapping positions of two outermost edges of the pointer images in the image window acquired by the same image sensor and connecting, on the two-dimensional space, a mapping position of the image sensor acquiring fewer pointer image with mapping positions of two outermost edges of the pointer image in the image window acquired by the same image sensor to form a quadrilateral;
    calculating four third internal bisectors of the quadrilateral; and
    connecting, on the two-dimensional space, a mapping position of one of two image sensors acquiring more pointer images with mapping positions of a predetermined point of the pointer images in the image window acquired by the same image sensor to intersect with the third internal bisectors thereby generating third possible positions.

13. The positioning method as claimed in claim 12, wherein a pair of previous correct positions of the pointers with respect to the touch surface was determined in a previous sample time before the image sensors acquire the image windows, and the positioning method further comprises:
  comparing the second possible positions with the pair of previous correct positions to obtain a pair of current correct positions when the numbers of pointer images in two of the image windows are smaller than that in the rest image window; and
  comparing the third possible positions with the pair of previous correct positions to obtain a pair of current correct positions when the numbers of pointer images in two of the image windows are larger than that in the rest image window.

14. The positioning method as claimed in claim 12, further comprising:
  selecting two image sensors acquiring different numbers of pointer images;

connecting, on the two-dimensional space, mapping positions of the two image sensors respectively with mapping positions of two outermost edges of the pointer images in the image windows acquired by the same two image sensors to form a quadrilateral;

calculating four first internal bisectors of the quadrilateral;

connecting, on the two-dimensional space, a mapping position of one of the two image sensors acquiring more pointer images with mapping positions of a predetermined point of the pointer images in the image window acquired by the same image sensor to intersect with the first internal bisectors thereby generating first possible positions.

15. The positioning method as claimed in claim 14, further comprising:

comparing the second possible positions with the first possible positions to obtain a pair of current correct positions when the numbers of pointer images in two of the image windows are smaller than that in the rest image window; and comparing the third possible positions with the first possible positions to obtain a pair of current correct positions when the numbers of pointer images in two of the image windows are larger than that in the rest image window.

16. The positioning method as claimed in claim 14, wherein the predetermined point is a center point or a center of weight of the pointer image.

17. The positioning method as claimed in claim 12, wherein when the numbers of pointer images in two of the image windows are larger than that in the rest image window, the positioning method further comprising:

connecting, on the two-dimensional space, mapping positions of two image sensors acquiring more pointer images with mapping positions of a predetermined point of the pointer images in the image windows acquired by the same two image sensors to form a quadrilateral;

defining four corners of the quadrilateral as fourth possible positions; and comparing the third possible positions with the fourth possible positions to obtain a pair of current correct positions.

18. The positioning method as claimed in claim 17, wherein the predetermined point is a center point or a center of weight of the pointer image.

19. The positioning method as claimed in claim 12, wherein the predetermined point is a center point or a center of weight of the pointer image.

20. A touch system, comprising:

a touch surface, wherein a plurality of pointers are operated above the touch surface to accordingly control the touch system;

at least two image sensors configured to acquire image windows looking across the touch surface and containing images of the pointers operating above the touch surface; and a processing unit generating a two-dimensional space according the image windows acquired by the image sensors, obtaining a quadrilateral and four internal bisectors of the quadrilateral by connecting mapping positions of the image sensors with mapping positions of two outermost edges of the pointer image in the image windows acquired by the image sensors on the two-dimensional space, and connecting a mapping position of the image sensor acquiring more pointer images with mapping positions of a predetermined point of the pointer images in the image window acquired by the same image sensor to intersect with the internal bisectors thereby generating possible positions.

* * * * *